(12) United States Patent
Nicklas

(10) Patent No.: US 10,008,978 B2
(45) Date of Patent: Jun. 26, 2018

(54) SOLAR RADIATION REDIRECTION DEVICE

(71) Applicant: John Matthew Nicklas, Ann Arbor, MI (US)

(72) Inventor: John Matthew Nicklas, Ann Arbor, MI (US)

( * ) Notice: Subject to any disclaimer, the term of this patent is extended or adjusted under 35 U.S.C. 154(b) by 12 days.

(21) Appl. No.: 15/259,637

(22) Filed: Sep. 8, 2016

(65) Prior Publication Data

US 2018/0069503 A1 Mar. 8, 2018

(51) Int. Cl.
*B64B 1/40* (2006.01)
*H02S 40/22* (2014.01)
*B64B 1/70* (2006.01)
*B64B 1/62* (2006.01)

(52) U.S. Cl.
CPC ............. *H02S 40/22* (2014.12); *B64B 1/40* (2013.01); *B64B 1/62* (2013.01); *B64B 1/70* (2013.01)

(58) Field of Classification Search
CPC .. H02S 40/22; B64B 1/40; B64B 1/62; B64B 1/70
USPC ........................................................ 136/246
See application file for complete search history.

(56) References Cited

U.S. PATENT DOCUMENTS

| 4,126,123 | A | 11/1978 | Hall |
| 4,534,525 | A | 8/1985 | Bliamptis |
| 8,668,850 | B2 | 3/2014 | Onishi et al. |
| 8,833,696 | B1 * | 9/2014 | Teller .................. B64B 1/14 244/125 |
| 9,290,258 | B1 | 3/2016 | DeVaul |
| 2010/0229850 | A1 | 9/2010 | Sankrithi |

FOREIGN PATENT DOCUMENTS

WO   WO 2014/028201 A2   2/2014

* cited by examiner

*Primary Examiner* — Jayne L Mershon
(74) *Attorney, Agent, or Firm* — Brinks Gilson & Lione

(57) ABSTRACT

A solar radiation redirection device includes an untethered balloon or balloon-like structure defining an inside volume. The balloon or balloon-like structure has a substantially transparent portion and a substantially reflective portion, wherein the substantially reflective portion is substantially parabolic in shape. The balloon or balloon-like structure also includes a secondary reflector located adjacent to the substantially transparent portion within the inside volume of the balloon or balloon-like structure. The substantially reflective portion is configured to receive solar radiation from an external source through the substantially transparent portion and concentrate the received solar radiation onto the secondary reflector. The secondary reflector is configured to direct the concentrated solar radiation towards a target, the target being external from the balloon or balloon-like structure.

20 Claims, 4 Drawing Sheets

US 10,008,978 B2

SOLAR RADIATION REDIRECTION DEVICE

BACKGROUND

1. Field of the Invention

The invention relates to solar redirection devices.

2. Description of Related Art

It is known that solar radiation, such as solar radiation generated by the sun, can be collected by solar panels and converted into electricity. However, obstacles such as cloud formations, buildings, topographical formations, and the like generally prevent the efficient collection of solar radiation. In addition, the cost per unit area of producing photovoltaic cells is very high. Currently, solar radiation reflectors may be utilized to direct and concentrate solar radiation onto a solar panel. However, theses solar radiation reflectors are located on the ground and suffer from the same limitations that can affect the performance of solar panels. As stated before, these limitations may include obstacles such as cloud formations, buildings, topographical formations, and the like.

SUMMARY

A solar radiation redirection device includes an untethered balloon or balloon-like structure defining an inside volume. The balloon or balloon-like structure has a substantially transparent portion and a substantially reflective portion, wherein the substantially reflective portion is substantially parabolic in shape. The balloon or balloon-like structure also includes a secondary reflector located adjacent to the substantially transparent portion within the inside volume of the balloon or balloon-like structure. The substantially reflective portion is configured to receive solar radiation from an external source through the substantially transparent portion and concentrate the received solar radiation onto the secondary reflector. The secondary reflector is configured to direct the concentrated solar radiation towards a target, the target being external from the balloon or balloon-like structure.

Further objects, features, and advantages of this invention will become readily apparent to persons skilled in the art after a review of the following description, with reference to the drawings and claims that are appended to and form a part of this specification.

DETAILED DESCRIPTION

Figure 1:
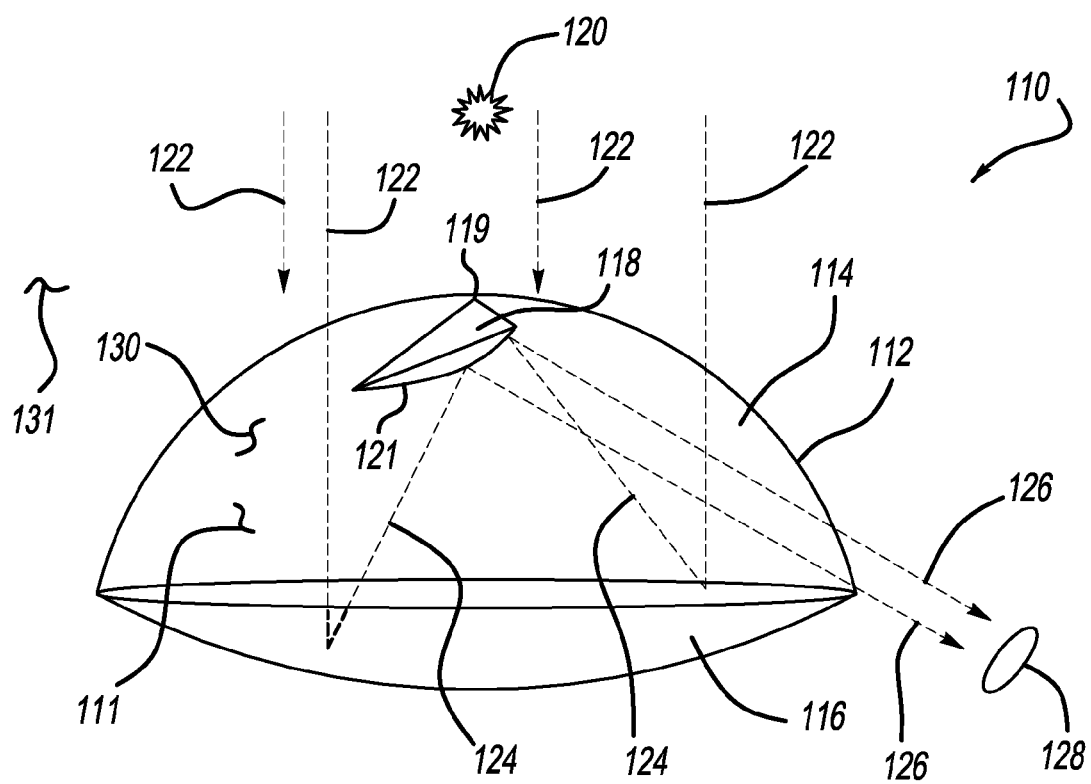
FIG. 1 is an illustration of a solar radiation redirection device, redirecting solar radiation from a source to a target.

Referring to FIG. 1, the solar radiation redirection device 110 is shown. The solar radiation redirection device 110 includes a balloon or balloon-like structure 112 defining an inside volume 111. The balloon or balloon-like structure 112 is untethered. By being untethered, the balloon or balloon-like structure 112 is not connected to the ground. Generally, the balloon or balloon-like structure 112 includes a substantially transparent portion 114 and a substantially reflective portion 116. The substantially transparent portion 112 may be made out of any material that is transparent or substantially transparent. For example, the substantially transparent portion 112 may be made out of a lightweight material, such as plastic, or any other suitable material.

Generally, the substantially reflective portion 116 is substantially parabolic in shape. The substantially reflective portion 116 may be made out of plastic having a reflective coating on a side facing the substantially transparent portion 114 of the balloon or balloon-like structure 112. Together, the substantially reflective portion 116 and the substantially transparent portion 114 form and define the inside volume 111. Generally, the inside volume 111 is airtight, so that any gas 130 located within cannot escape into the atmosphere 131.

The solar radiation redirection device 110 also includes a secondary reflector 118 located adjacent to the substantially transparent portion 114 of the balloon or balloon-like structure 112. Furthermore, the secondary reflector 118 is located within the inside volume 111 of the balloon or balloon-like structure 112. The secondary reflector, in this example, may be located near an apex 119 of the substantially transparent portion 114 of the balloon or balloon-like structure 112. The secondary reflector 118 may be substantially convex and generally has a side 121 that is reflective or substantially reflective.

In this example, the solar radiation redirection device 110 receives solar radiation from an external source 120. In this case, the external source 120 is the sun. However, it should be understood, that the external source 120 may be any source capable of generating solar radiation. Substantially collimated solar radiation 122 generated by the source 120 is configured to be reflected by the substantially reflective portion 116. The solar radiation 122 passes through the substantially transparent portion 114 to the substantially reflective portion 116.

The substantially reflective portion 116 concentrates the received solar radiation 122 into converging beams 124 that are directed towards the side 121 of the secondary reflector 118. Note that in FIG. 1, the rays representing the paths of solar radiation 122 and 124 are drawn to be thicker when they pass behind primary reflector 118. In turn, the secondary reflector 118 is configured to direct the concentrated solar radiation 126 towards a target 128. Here, secondary reflector 118 also collimates the concentrated solar radiation 126 to promote transmission over a greater range. The target 128 is external from the balloon or balloon-like structure 112.

The target 128 may be any target capable of receiving the concentrated solar radiation 126. For example, the target 128 may be a solar panel or panels capable of converting the concentrated solar radiation 126 to electricity. However, it should be understood that the target 128 may be any target capable of receiving the concentrated solar radiation 126. For example, the target 128 may simply be a location to which the concentrated solar radiation 126 has an effective use.

The solar radiation redirection device 110, as stated earlier, has an inside volume 111. The inside volume 111 may include a gas 130. The gas 130 may have a density less than a density of the atmosphere 131 surrounding the balloon or balloon-like structure 112. Because of this difference in density, the solar radiation redirection device 110 is capable of being buoyant in the atmosphere 131. In this example, the gas 130 may be hot air, but any gas may be utilized so long as the gas 130 has a density less than the density of the atmosphere 131 surrounding the balloon or balloon-like structure 112.

Figure 2:
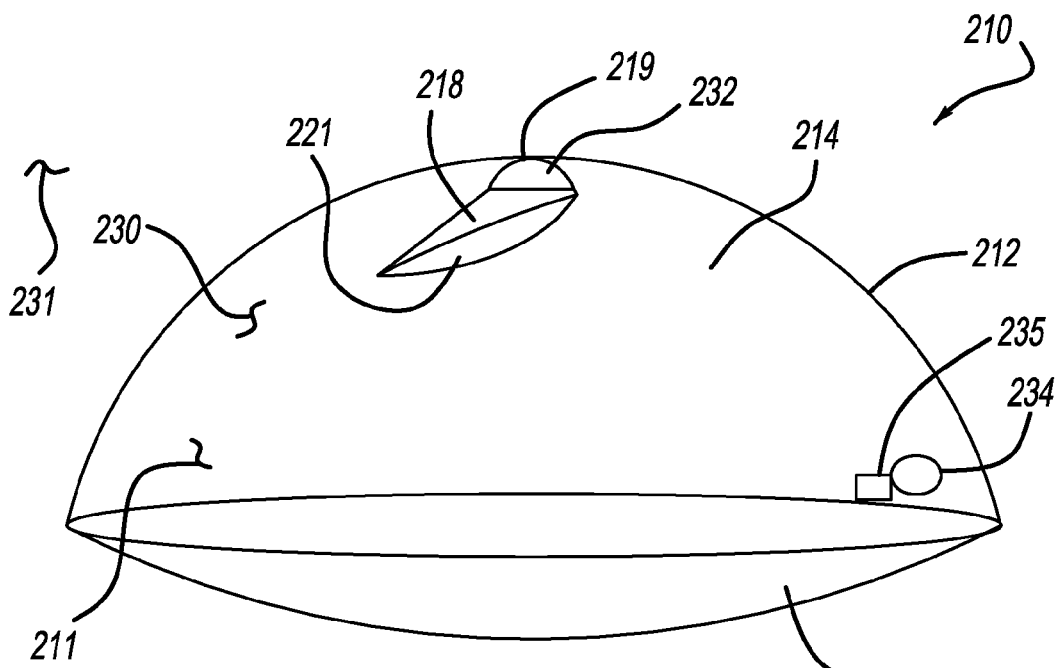
FIG. 2 is an illustration of a solar radiation redirection device having an element being configured to absorb solar radiation and heat hot air, as well as a port and a motor for moving gas into or out of the interior volume of the balloon or balloon-like structure.

Referring to FIG. 2, another embodiment of the solar radiation redirection device 210 is shown. It should be understood that like reference numerals have been utilized to refer to like elements, with the exception that the reference numerals have increased by 100 to correspond with the figure numbers. It should be understood that throughout this specification that this methodology regarding the reference numerals will be utilized.

In this embodiment, the solar radiation redirection device 210 includes an element 232 located near the apex 219 of the substantially transparent portion 214 of the balloon or balloon-like structure 210. The element 232 is located within the inside volume 211. The element 232 may be configured to absorb solar radiation and heat the gas, which may be hot air, so as to reduce the density of the gas 230 as it relates to the density of the gas of the atmosphere 231. The element 232 may simply be a dark colored, such as black, piece of material capable of absorbing solar radiation so as to heat the gas 230. Furthermore, the element 232 may also be a heating device, such as an electronic or ceramic heater. The heating element 232 does not need to be placed at this location in the balloon, and may simply be incorporated into the primary reflector 216 or secondary reflector 221.

Also, the solar radiation redirection device 210 includes a port 234 for allowing the gas 230 out of the central volume 211 or, conversely, allowing atmospheric gas from the atmosphere 231 into the central volume 211. Gas can be pumped into or out of the central volume 211 through the port 234 with the aid of a pump 235.

Figure 3:
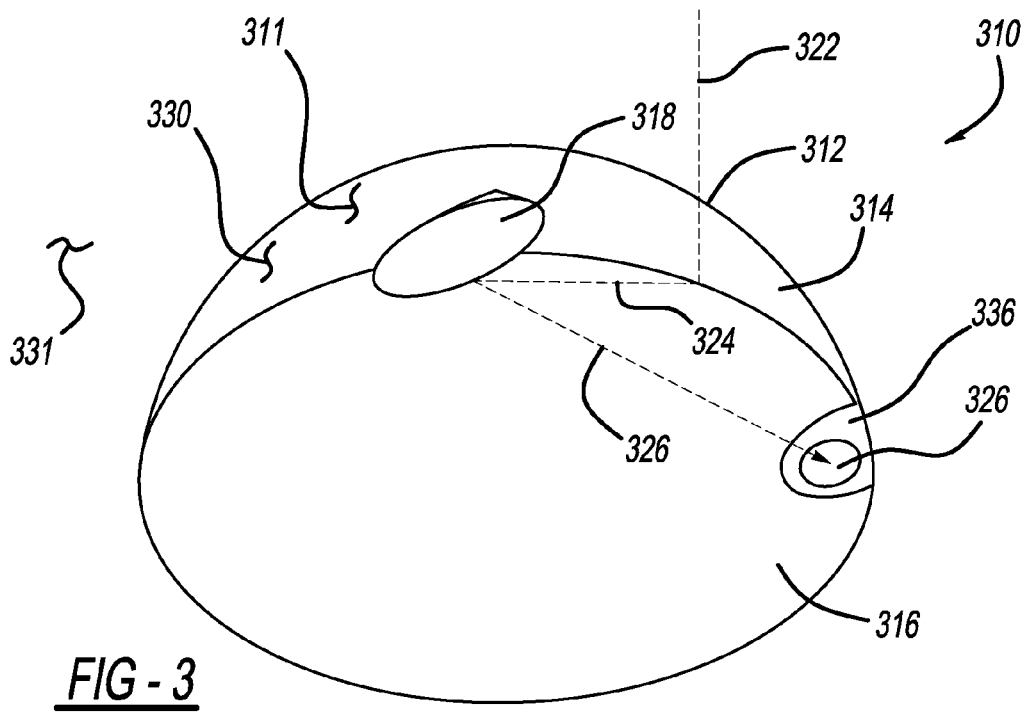
FIG. 3 is an illustration of a solar radiation redirection device having a substantially transparent opening.

Referring to FIG. 3, another embodiment of the solar radiation redirection device 310 is shown. In this embodiment, a substantially transparent opening 336 is defined within the substantially reflective portion 316. The substantially transparent opening 336 may be made of a material similar to the substantially transparent portion 314. The secondary reflector 318, in this embodiment, may be configured to direct all or a portion of the outgoing beam 326 through the substantially transparent opening 336.

The purpose of this substantially transparent opening 336 is to give the solar radiation redirection device 310 a greater range for directing the outgoing beam 326. For example, the outgoing beam 126, shown in the embodiment of FIG. 1, is limited to being directed to the target 128 only through the substantially transparent portion 114. In the embodiment shown in FIG. 3, all or part of the outgoing beam 326 may be directed through the transparent portion 314 and/or the opening 336 as well. The intersection of the outgoing beam 326 with the transparent opening 336 is drawn as a circle, which is also labeled 326 because it is a further illustration of the outgoing column of solar radiation 326.

Figure 4:
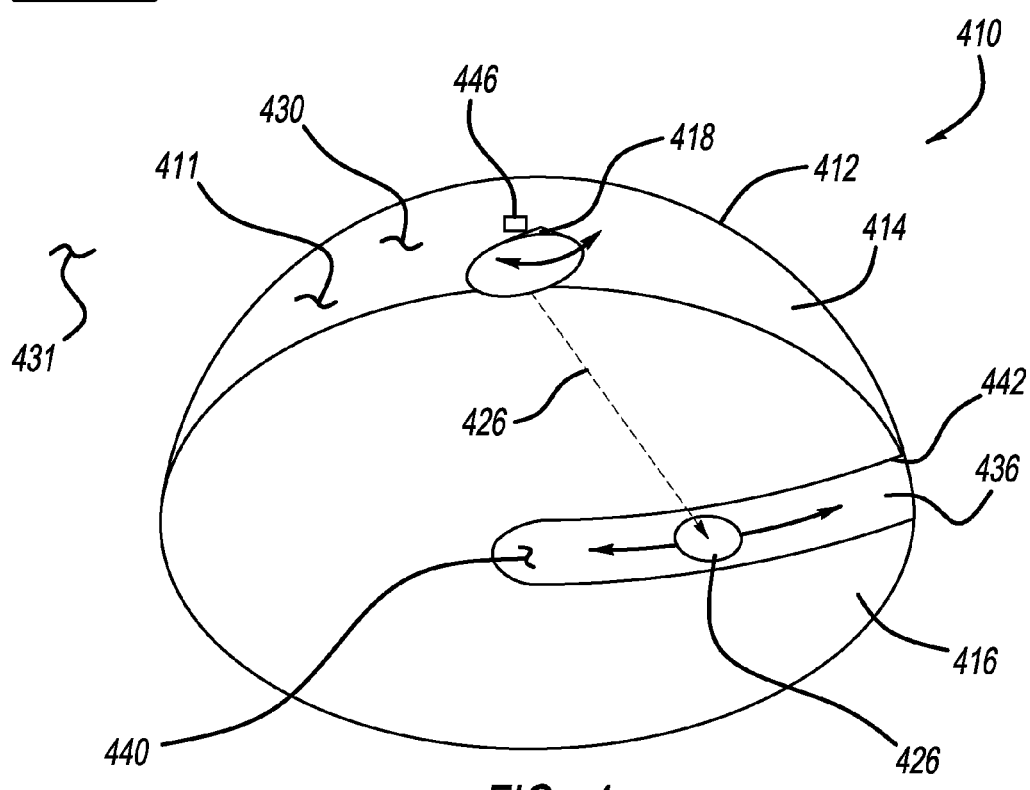
FIG. 4 is an illustration of a solar radiation redirection device having a substantially transparent opening and a secondary reflector configured to pivot to direct an outgoing beam of solar radiation.

Referring to FIG. 4, another embodiment of the solar radiation redirection device 410 is shown. In this embodiment, the substantially transparent opening 436 extends from a central area 440 of the substantially reflective portion 416 to an outside perimeter 442 of the substantially reflective portion 416. As such, in this embodiment, the opening 436 allows for an even greater range for directing the outgoing beam 426. Outgoing beam 426 is again represented both with a ray indicating one of its possible directions and a circle that shows the intersection of this beam of light with the substantially transparent opening 436. The secondary reflector 418 may be configured to pivot to direct the outgoing beam 426 in a range of possible target directions. This pivoting action of the secondary reflector 418 may be accomplished by a small motor 446 which is capable of pivoting the secondary reflector 418.

Figure 5:
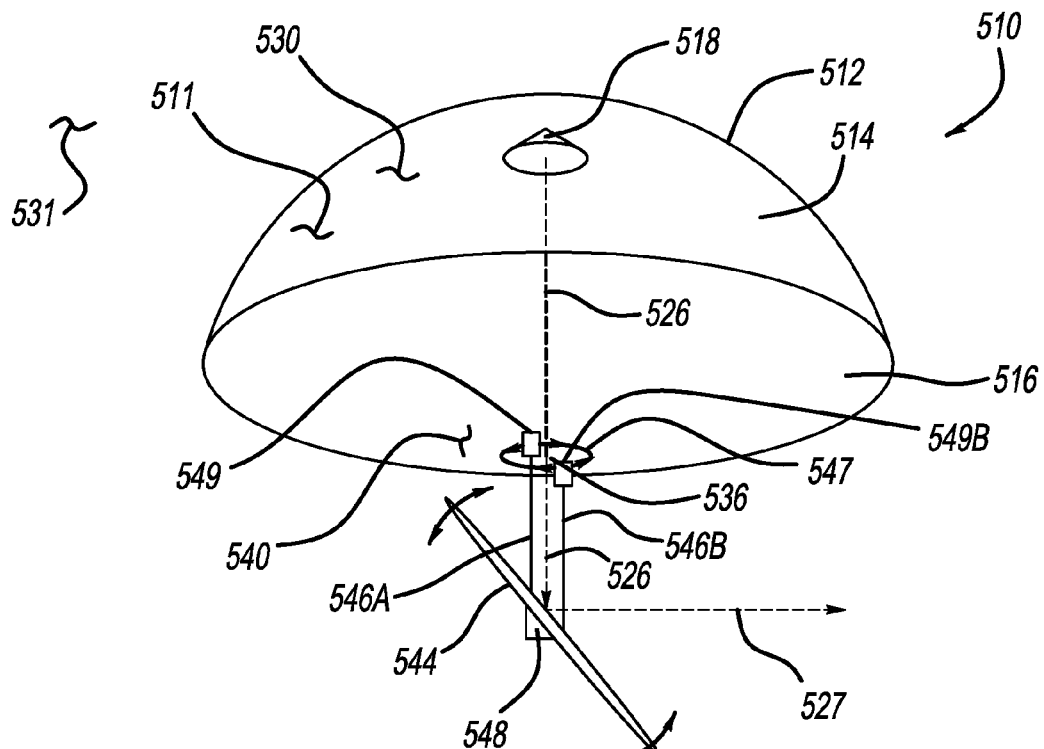
FIG. 5 is an illustration of a solar radiation redirection device having a tertiary reflector.

Referring to FIG. 5, another embodiment of the solar radiation redirection device 510 is shown. In this embodiment, the substantially transparent opening 536 is located in the central area 540 of the substantially reflective portion 516. In this embodiment, the collimated outgoing beam 526 is directed through the opening 536 by the secondary reflector 518. (Note that as in FIG. 1, the outgoing beam 526 is drawn to be thicker when it passes behind primary reflector 516. The perspective drawn is from the underside of device 510.) The solar radiation redirection device 510 further includes a tertiary reflector 544 that is configured to reflect the outgoing beam 526 in any one of a number of different angles, transmitting it as redirected outgoing beam 527.

The tertiary reflector 544 is capable of pivoting on at least one axis. This pivoting action may be aided with the help of a motor 548 that is configured to move the tertiary reflector 544 so as to reflect the outgoing beam 526 in any one of a number of different directions. The tertiary reflector 544 may be attached to the solar radiation redirection device 510 through the use of mechanical supports 546A and 546B, which allow the tertiary reflector 540 to pivot about an axis. The tertiary reflector 544 may be coated on one or both sides with a reflective material so as to maximize the reflection of the outgoing beam 526 to a target as redirected outgoing beam 527.

Mechanical supports 546A and 546B may also revolve around a second axis to pivot tertiary reflector 544 and further increase the range of possible directions that outgoing beam 526 may be directed. Support track 547, which is positioned at the border between the substantially transparent opening 536 and the substantially reflective portion 516, may connect to mechanical supports 546A and 546B and allow them to revolve in this manner. This second pivoting motion of mirror 544 may be aided by motors 549A and 549B, which are located proximal to the connection between the mechanical supports 546A and 546B and the support track 547.

Figure 6:
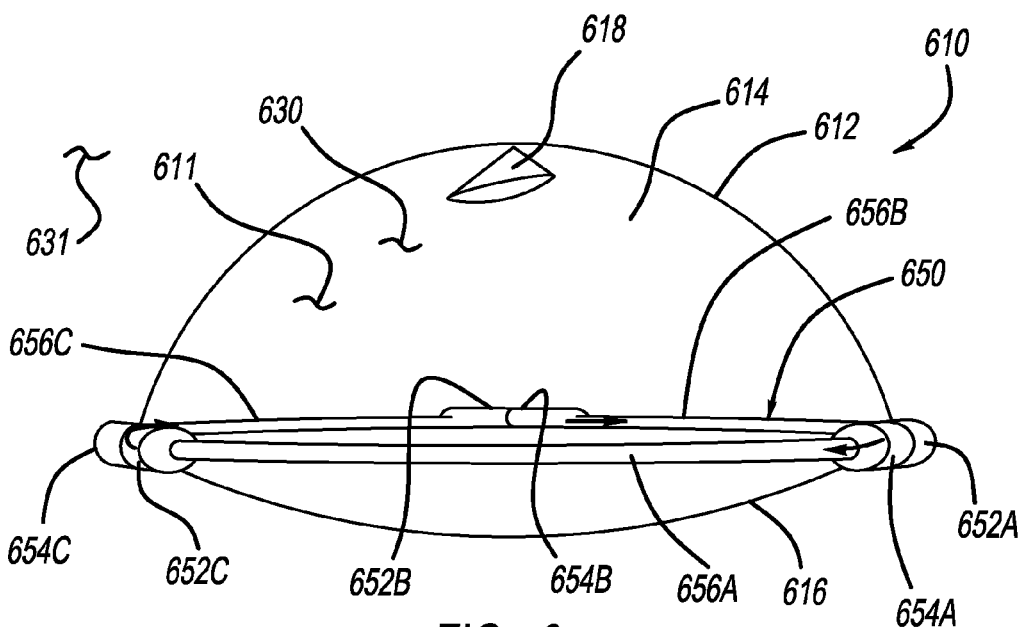
FIG. 6 is an illustration of a solar radiation redirection device having a ballast system.

Referring to FIG. 6, another embodiment of the solar radiation redirection device 610 is shown. In this embodiment, the solar radiation redirection device 610 includes a ballast system 650 located between substantially reflective portion 616 and the substantially transparent portion 614. The ballast system 650 is capable of containing a fluid in at least portions thereof. The ballast system includes at least three reservoirs 652A, 652B, and 652C for retaining variable amounts of fluid. The ballast system also includes several pumps 654A, 654B, and 654C that are configured to move the fluid located within the ballast system 650 from one reservoir to another reservoir. The reservoirs 652A, 652B, and 652C are fluidly connected to each other by fluid conduits 656A, 656B, and 656C. The ballast system 650 is configured to rotate the balloon or balloon-like structure 612 about a horizontal axis based on the location of the fluid within the ballast system 650.

Here, the ballast system 650 forms a fluid circuit. The fluid within the circuit may be moved in only one direction, for example, clockwise or counterclockwise, from one reservoir to another reservoir, by the pumps 654A, 654B, and 654C.

Figure 7:
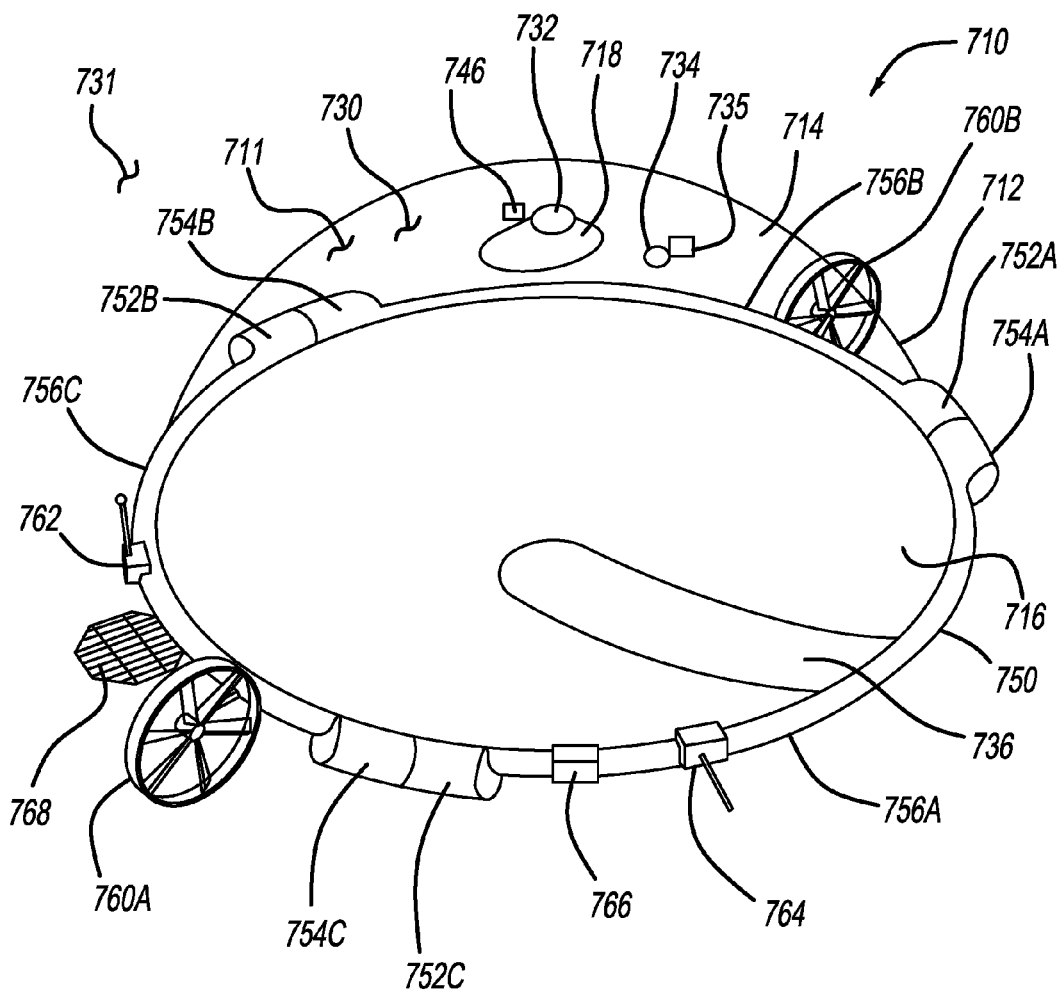
FIG. 7 is an illustration of a solar radiation redirection device having a heating element, ballast, substantially transparent opening, fans located externally on the balloon or balloon-like structure, port for moving gas into or out of the interior volume of the balloon, and additional electronics.

Referring to FIG. 7, another embodiment of the solar radiation redirection device 710 is shown. In this embodiment, the solar radiation redirection device 710 includes fans 760A and 760B located externally on the balloon or balloon-like structure 712. The fans 760A and 760B may be configured to provide a tangential force to the balloon or balloon-like structure 712 so as to either rotate the balloon or balloon-like structure 712 about a vertical axis, or push the balloon or balloon-like structure 712 horizontally.

Furthermore, in this embodiment, the solar radiation redirection device 710 includes an electronic control unit 766. The electronic control unit 766 may be in communication with at least one sensor 764. Furthermore, the electronic control unit 766 may be in communication with a means for repositioning the balloon or balloon-like structure 712. The means for repositioning the balloon or balloon-like structure could include the ballast system 750, the fans 760A and 760B, the heating element 732 or the port 734 and associated pump 735. In addition, the electronic control unit 766 may also be in communication with the secondary reflector 718 and the associated motor 746, and/or the tertiary reflector 544 and the associated motor or motors 548, 549A, and 548B of FIG. 5.

The electronic control unit 766 may be configured to receive information from the sensor 764 and actuate the means for repositioning the balloon, such as the fans 760A and 760B, the ballast system 750, the heating element 732, and/or the port 734. By so doing, this allows the electronic control unit to control the movement of the solar radiation redirection device 710. Furthermore, the electronic control unit 766 can rotate the secondary reflector 718 and/or the tertiary reflector 544 as well, so as to direct the outgoing beam to its intended target. As to the sensor 764, the sensor 764 may be a single sensor or may be multiple sensors. These sensors may include a global navigation satellite receiver, a white light sensor, a compass, a gyroscope, a thermometer, a pressure sensor, and/or an attitude sensor.

The electronic control unit 766 may be in communication with the transceiver 762 that is capable of receiving and/or sending signals from an external device, such a command center located on the ground. Based on these received signals, the electronic control unit 766 can either control the position of the solar radiation redirection device 710 and/or the direction of the outgoing beam of radiation.

The solar radiation redirection device 710 may also have an externally mounted solar panel 768. The external mounted solar panel 768 may be utilized to power any one of the motors or electronics mentioned in this description. For example, the solar panel 768 may provide power to the motors of the ballast system 750, the external fan 760A and 760B, the sensor 764, the electronic control device 766, the motor 746, the port pump 735 and/or the tertiary reflector motors 548, 549A, and 549B.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A solar radiation redirection device comprising:
an inflated airborne structure defining an inside volume, the inflated airborne structure being untethered;
wherein the inflated airborne structure comprises a substantially transparent portion and a substantially reflective portion;
wherein the substantially reflective portion is substantially parabolic in shape;
a secondary reflector located adjacent to the substantially transparent portion of the inflated airborne structure and within the inside volume of the inflated airborne structure;
wherein the substantially reflective portion is configured to receive solar radiation from an external source through the substantially transparent portion and concentrate the received solar radiation onto the secondary reflector; and
wherein the secondary reflector is configured to direct the concentrated solar radiation towards a target, the target being external from the inflated airborne structure.

2. The solar radiation redirection device of claim 1, wherein the secondary reflector is substantially convex in shape.

3. The solar radiation redirection device of claim 1, further comprising a gas within the inside volume, the gas having a density less than the density of the atmosphere surrounding the inflated airborne structure.

4. The solar radiation redirection device of claim 3, further comprising:
wherein the gas is hot air; and an element in the inside volume of the inflated airborne structure, the element being configured to absorb solar radiation and heat the hot air.

5. The solar radiation redirection device of claim 1, further comprising a substantially transparent portion adjacent to the substantially reflective portion for allowing the outgoing beam of solar radiation to pass there through.

6. The solar radiation redirection device of claim 5, wherein the secondary reflector is configured to pivot to direct the outgoing beam of solar radiation in a range of possible target directions.

7. The solar radiation redirection device of claim 6, further comprising a motor configured to pivot the secondary reflector and direct the concentrated beam to a target within a redirection range of the solar radiation redirection device.

8. The solar radiation redirection device of claim 5, further comprising at least one tertiary reflector configured to redirect the outgoing beam of solar radiation to a range of possible target directions.

9. The solar radiation redirection device of claim 8, further comprising a motor or motors configured to pivot the tertiary reflector and direct the concentrated beam to a target within a redirection range of the solar radiation redirection device.

10. The solar radiation redirection device of claim 1, further comprising:
a ballast system located between the substantially reflective portion of the inflated airborne structure and the substantially transparent portion;
the ballast system being capable of containing a fluid in at least portions thereof;
the ballast system comprising at least three reservoirs for retaining variable amounts of fluid; and
wherein the ballast system further comprises several pumps configured to move fluid from one reservoir to another reservoir, wherein the ballast system is configured to rotate the inflated airborne structure about a horizontal axis based on the location of the fluid within the ballast system.

11. The solar radiation redirection device of claim 10, wherein the ballast system forms a fluid circuit, and the fluid within the circuit is moved in only one direction from one reservoir to another reservoir by three pumps.

12. The solar radiation redirection device of claim 1, further comprising at least one fan located externally on the inflated airborne structure, the at least one fan configured to provide tangential force to the inflated airborne structure.

13. The solar radiation redirection device of claim 1, further comprising a port located on the exterior of the balloon or balloon-like structure, the port configured to allow a gas into or out of the central volume of the balloon or balloon-like structure.

14. The solar radiation redirection device of claim 13, further comprising a pump, wherein the pump is configured to move the gas into or out of the central volume of the inflated airborne structure via the port.

15. The solar radiation redirection device of claim 1, further comprising:
an electronic control unit;
at least one sensor in communication with the electronic control unit;
a means for repositioning the inflated airborne structure;
a means for directing the concentrated beam of solar radiation in a range of directions to maximize transmission to target; and
wherein the electronic control unit is configured to receive information from the at least one sensor and actuate the means for repositioning the inflated airborne structure based on the information received from the at least one sensor.

16. The solar radiation redirection device of claim 15, wherein the at least one sensor is a global navigation satellite system receiver, a white light sensor, a compass, a gyroscope, a thermometer, a pressure sensor, or an attitude sensor.

17. The solar radiation redirection device of claim 15, wherein the means for repositioning the inflated airborne structure is one or more of:
a heating element on the interior of the inflated airborne structure;
one or more fans mounted on the outside of the inflated airborne structure;
a ballast system a ballast system located between the substantially reflective portion of the inflated airborne structure and the substantially transparent portion, the ballast system being capable of containing a fluid in at least portions thereof, the ballast system comprising at least three reservoirs for retaining variable amounts of fluid, and wherein the ballast system further comprises several pumps configured to move fluid from one reservoir to another reservoir, wherein the ballast system is configured to rotate the inflated airborne structure about a horizontal axis based on the location of the fluid within the ballast system; or
a port located on either the exterior of the inflated airborne structure, the port configured to allow a gas into or out of the central volume of the inflated airborne structure.

18. The solar radiation redirection device of claim 15, further comprising a transmitter in communication with the electronic control unit, the transmitter configured to allow the electronic control unit to communicate with an external device.

19. The solar radiation redirection device of claim 15, wherein the electronic control unit is configured to send and receive information to and from the external device and actuate the means for repositioning the inflated airborne structure and directing the concentrated beam to a target based on the information received from the external device.

20. The solar radiation redirection device of claim 1, further comprising:
at least one solar panel for receiving solar radiation to power at least one of the following:
an electronic control unit and any associated sensors or transmitters
one or more fans mounted on the outside of the inflated airborne structure;
a ballast system a ballast system located between the substantially reflective portion of the inflated airborne structure and the substantially transparent portion, the ballast system being capable of containing a fluid in at least portions thereof, the ballast system comprising at least three reservoirs for retaining variable amounts of fluid, and wherein the ballast system further comprises several pumps configured to move fluid from one reservoir to another reservoir, wherein the ballast system is configured to rotate the inflated airborne structure about a horizontal axis based on the location of the fluid within the ballast system; or
a pump controlling airflow through a port located on the exterior of the inflated airborne structure, the port configured to allow a gas into or out of the central volume of the inflated airborne structure.

\* \* \* \* \*